(12) United States Patent
Levesque et al.

(10) Patent No.: US 12,000,803 B2
(45) Date of Patent: Jun. 4, 2024

(54) METHODS AND APPARATUS TO PERFORM LOAD MEASUREMENTS ON FLEXIBLE SUBSTRATES

(71) Applicant: Illinois Tool Works Inc., Glenview, IL (US)

(72) Inventors: Philippe Levesque, Foxboro, MA (US); Alexander T. Carbone, Norton, MA (US)

(73) Assignee: Illinois Tool Works Inc., Glenview, IL (US)

( * ) Notice: Subject to any disclaimer, the term of this patent is extended or adjusted under 35 U.S.C. 154(b) by 643 days.

(21) Appl. No.: 16/900,210

(22) Filed: Jun. 12, 2020

(65) Prior Publication Data
US 2020/0400541 A1 Dec. 24, 2020

Related U.S. Application Data

(60) Provisional application No. 62/865,641, filed on Jun. 24, 2019.

(51) Int. Cl.
*G01N 3/20* (2006.01)
*G01N 3/06* (2006.01)
*G09F 9/30* (2006.01)

(52) U.S. Cl.
CPC ............... *G01N 3/20* (2013.01); *G01N 3/066* (2013.01); *G01N 2203/0005* (2013.01);
(Continued)

(58) Field of Classification Search
CPC .. G01N 3/20; G01N 3/066; G01N 2203/0005; G01N 2203/0023;
(Continued)

(56) References Cited

U.S. PATENT DOCUMENTS 8,544,340 B1 * 10/2013 Ardelean ................. G01N 3/20
73/849
8,919,205 B2 12/2014 Huang
(Continued)

FOREIGN PATENT DOCUMENTS

| JP | 2019039743 | 3/2019 |
| KR | 101489667 | 2/2015 |
| TW | 200916748 | 4/2009 |

OTHER PUBLICATIONS

Int'l Search Report and Written Opinion Appln No. PCT/US2020/037710 dated Oct. 8, 2020.
(Continued)

*Primary Examiner* — Brandi N Hopkins
(74) *Attorney, Agent, or Firm* — McAndrews, Held & Malloy, Ltd.

(57) ABSTRACT

An example flexible substrate testing system includes: a first substrate support structure configured to hold a first portion of a flexible substrate under test; a second substrate support structure configured to hold a second portion of the flexible substrate; one or more actuators configured to move the first and second substrate support structures at respective angles to fold the flexible substrate; and load cells configured to measure loads on the first substrate support structure and the second substrate support structure while the actuator moves the first substrate support structure and the second substrate support structure.

20 Claims, 11 Drawing Sheets

(52) U.S. Cl.
CPC ............... *G01N 2203/0023* (2013.01); *G01N 2203/0037* (2013.01); *G01N 2203/0282* (2013.01); *G01N 2203/0617* (2013.01); *G01N 2203/0676* (2013.01); *G09F 9/301* (2013.01)

(58) Field of Classification Search
CPC ... G01N 2203/0037; G01N 2203/0282; G01N 2203/0617; G01N 2203/0676; G01N 3/38; G09F 9/301; H01L 21/67748; H01L 21/67167; C03C 23/007; B24B 37/013; H05K 13/08; G02F 1/1309; G01R 31/2808; G01R 27/08; B82Y 10/00; G01L 5/00; G01D 21/00; G06F 1/1652
See application file for complete search history.

(56) References Cited

U.S. PATENT DOCUMENTS

| | | | | |
|---|---|---|---|---|
| 2010/0116064 | A1* | 5/2010 | Wen | G01N 3/20 73/849 |
| 2017/0013729 | A1* | 1/2017 | Rothkopf | H04M 1/0268 |
| 2019/0154555 | A1* | 5/2019 | Han | G01N 3/04 |

OTHER PUBLICATIONS

Taiwan Patent Appln No. 109121263 Search Report dated Nov. 15, 2023.

\* cited by examiner

METHODS AND APPARATUS TO PERFORM LOAD MEASUREMENTS ON FLEXIBLE SUBSTRATES

RELATED APPLICATIONS

The present application claims the benefit of U.S. Patent Application Ser. No. 62/865,641, filed Jun. 24, 2019, entitled "METHODS AND APPARATUS TO PERFORM LOAD MEASUREMENTS ON FLEXIBLE SUBSTRATES." The entirety of U.S. Patent Application Ser. No. 62/865,641 is expressly incorporated herein by reference.

BACKGROUND

This disclosure relates generally to materials testing, and more particularly, to methods and apparatus to perform load measurements on flexible substrates.

Reliability testing for an assembly, or moving components of an assembly, may involve repetitively performing intended and/or unintended movements of the components to verify that the components and/or assembly reliably operates for a defined minimum number of cycles of the movements. For example, reliability testing of a flexible substrate may involve repeatedly flexing the substrate in one or more ways, while testing for continued operation of the device and/or monitoring various modes of failure.

SUMMARY

Methods and apparatus to perform load measurements on flexible substrates are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1A:
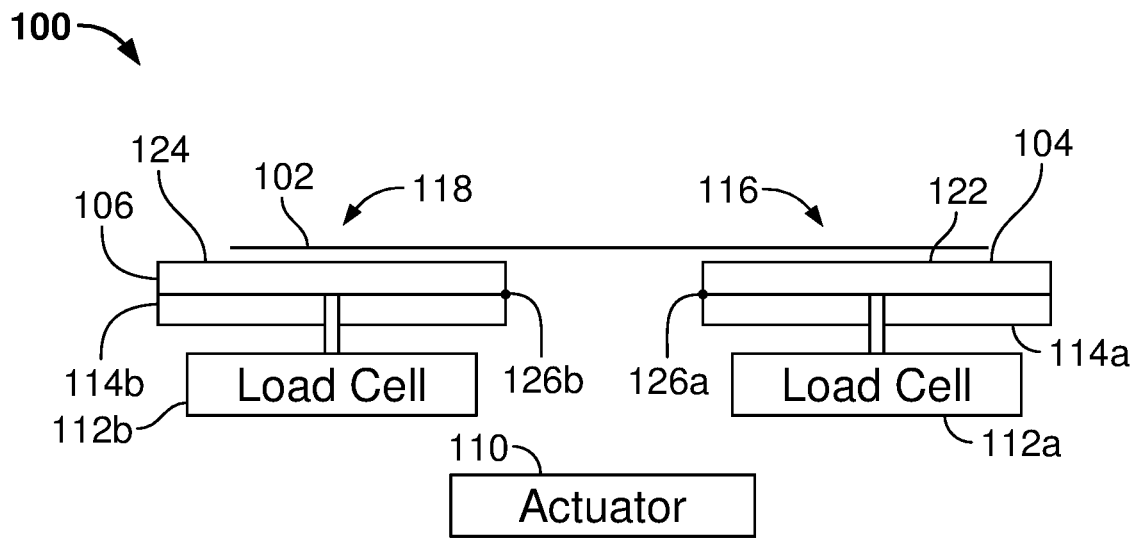
FIGS. 1A and 1B are block diagrams illustrating an example flexible substrate test system to perform mechanical property testing on a flexible substrate, in accordance with aspects of this disclosure.

Conventional flexible substrate testing systems do not measure loads or stresses on the flexible substrates during folding or unfolding. Instead, conventional flexible substrate testing systems may involve testing such as defect analysis and other static testing and analysis.

Disclosed example flexible substrate testing systems and methods provide stress testing for flexible substrates, including measurement of dynamic and/or static loads on the flexible substrate during deformation such as folding and/or unfolding. Some disclosed example systems and methods reduce or minimize additional stress induced on the flexible substrate by the flexible substrate testing system itself. For example, some disclosed flexible substrate testing systems include fixturing that provides repetitive folding and unfolding of a flexible substrate, such as a flexible display screen. Disclosed examples configure the fixturing, such as guiding of the moving parts, such that the fixturing does not create additional compression or tension on the flexible substrate as the ends of the substrate are folded together or unfolded.

In contrast with conventional flexible substrate testing systems that perform two 90 degree bends, disclosed example test systems reduce or prevent stress induced on the substrate under test from the test fixture (e.g., stress other than the stress naturally and necessarily experienced by the material due to folding). Some conventional testing systems that perform two 90 degree bends attempt to eliminate such stress by holding the material such that section of the substrate is used to function as a buffer against tension and compression of the material.

In contrast with conventional test systems, disclosed example test systems are geometrically configured to rotate the portions of the substrate such that the substrate may fully extend in the open or unfolded position, but do not experience tension stress caused by rotation of the test fixture. As a result, disclosed example test systems and test fixtures for flexible substrates provide more accurate measurements of stress on flexible substrates during repetitive stress measurements.

Disclosed example flexible substrate testing systems include a first substrate support structure configured to hold a first portion of a flexible substrate under test, a second substrate support structure configured to hold a second portion of the flexible substrate, one or more actuators configured to move the first and second substrate support structures at respective angles to fold the flexible substrate, and load cells configured to measure loads on the first substrate support structure and the second substrate support structure while the actuator moves the first substrate support structure and the second substrate support structure.

In some example flexible substrate testing systems, the first and second substrate support structures are configured to fold the substrate to an angle of more than 0 degrees and less than or equal to 360 degrees. In some example flexible substrate testing systems, the first substrate support structure is configured to rotate up to 90 degrees and the second substrate support structure is configured to rotate up to 90 degrees to fold the substrate at an angle of up to 180 degrees. In some example flexible substrate testing systems, the one or more actuators are configured to move the first and second substrate support structures simultaneously.

In some example flexible substrate testing systems, the one or more actuators are configured to move the first and second substrate support structures by driving a single input shaft. In some example flexible substrate testing systems, the input shaft is coupled to a first secondary shaft configured to move the first substrate support structure and to a second secondary shaft configured to move the second substrate support structure. In some example flexible substrate testing systems, the first secondary shaft is coupled to the first substrate support structure via a first gearing system configured to rotate the first substrate support structure about a first axis defined by the first gearing system, and the second secondary shaft is coupled to the second substrate support structure via a second gearing system configured to rotate the second substrate support structure about a second axis defined by the second gearing system. In some example flexible substrate testing systems, the first and second gearing systems are configured to rotate the first portion of the flexible substrate and the second portion of the flexible substrate simultaneously and proportionally. In some example flexible substrate testing systems, the first axis and the second axis are spaced apart so as to create multiple folds in the substrate.

Some example flexible substrate testing systems include control circuitry configured to determine the loads on the flexible substrate based on load information from the load cells.

In some example flexible substrate testing systems, the first substrate support structure includes a first plate having a first surface and the second substrate support structure includes a second plate having a second surface. In some example flexible substrate testing systems, the flexible substrate testing system is configured to position a first plane of the first surface and a second plane of the second surface vertically during the folding and unfolding.

Some example flexible substrate testing systems include a first translation linkage configured to hold the first substrate support structure and to limit motion of the first substrate support structure in directions parallel to the first surface of the first substrate support structure. Some example flexible substrate testing systems include a second translation linkage configured to hold the second substrate support structure and to limit motion of the second substrate support structure in directions parallel to the second surface of the second substrate support structure. In some example flexible substrate testing systems, the first translation linkage includes a first four-bar linkage coupled to the first substrate support structure and the second translation linkage includes a second four-bar linkage coupled to the second substrate support structure.

Some example flexible substrate testing systems include control circuitry configured to determine the loads on the flexible substrate based on a dynamic load measured by the load cells during the folding or unfolding of the flexible substrate. Some example flexible substrate testing systems include control circuitry configured to determine the load on the flexible substrate based on a static load measured by the load cells at a completion of the folding or unfolding of the flexible substrate.

Disclosed example methods to measure loads on a flexible substrate involve: moving, via an actuator, a first portion of a flexible substrate under test and a second portion of the flexible substrate to fold or unfold the flexible substrate; and measuring a load on the flexible substrate resulting from the moving.

In some example methods, moving the first portion of the flexible substrate involves rotating a first substrate support structure holding the first portion of the flexible substrate, and moving the second portion of the flexible substrate involves rotating a second substrate support structure holding the second portion of the flexible substrate.

Some other disclosed example flexible substrate testing systems include: a first plate comprising a first surface configured to hold a first side of a flexible substrate under test; a first translation linkage configured to hold the first plate and to limit motion of the second plate in directions parallel to the first surface of the first plate; a second plate comprising a second surface configured to hold a second side of the flexible substrate; a second translation linkage configured to hold the second plate and to limit motion of the second plate in directions parallel to the second surface of the second plate; one or more actuators configured to move the first and second plates at respective angles to fold the substrate to an angle greater than 0 degrees and less than or equal to 180 degrees; and load cells configured to measure loads on the first plate and the second plate while the actuator moves the first plate and the second plate.

Figure 1B:
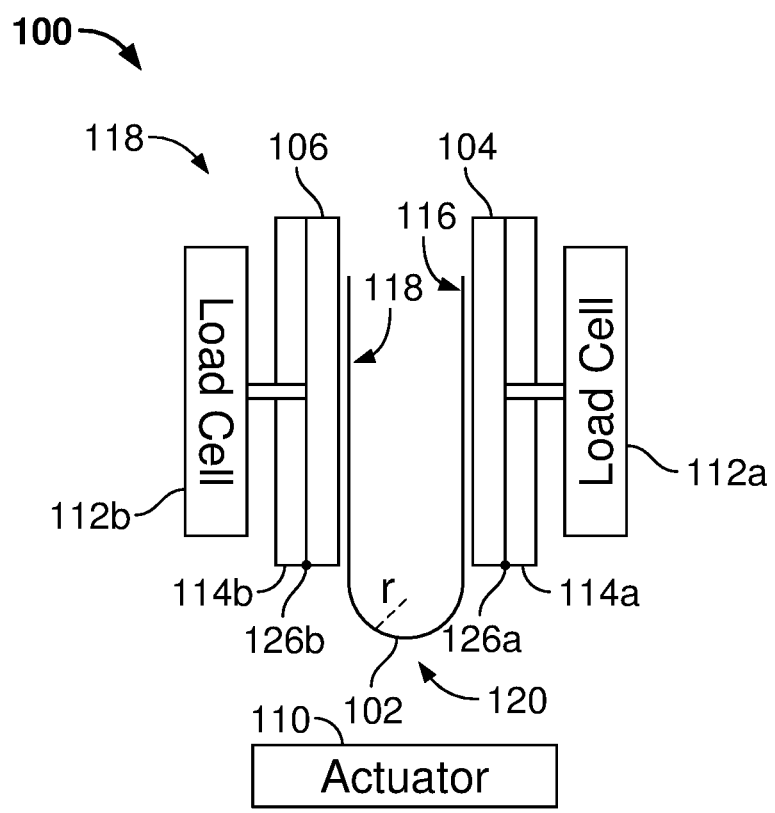

FIGS. 1A and 1B are block diagrams illustrating an example flexible substrate test system 100 to perform mechanical property testing on a flexible substrate 102. FIG. 1A illustrates the flexible substrate test system 100 in an open, flat, or unfolded position. FIG. 1B illustrates the test system 100 in a closed or folded position. The example flexible substrate 102 may be a flexible display screen or other device, fabric, material, and/or any other substrate. The system 100 of FIG. 1 is configured to repeatedly fold and unfold the flexible substrate 102 to measure stress (e.g., folding force) on the substrate 102.

The example system 100 includes a first plate 104, a second plate 106, an actuator 110, first and second load cells 112a, 112b, and first and second translation linkages 114a, 114b. The system 100 may include additional features, such as structural support or framing, processing circuitry, communications and/or input/output (I/O) circuitry, and/or any other components. The load cells 112a, 112b may output load measurements during folding and/or unfolding (e.g., measurements of dynamic load) and/or at the conclusion of a folding and/or unfolding process (e.g., measurements of static load).

When folded, the flexible substrate 102 is considered to have a first side 116 and a second side 118 on opposing ends of the bend 120 or fold in the substrate 102. The first side 116 and the second side 118. FIG. 1 illustrates the substrate in an unfolded or flat position (solid line) and folded position (dotted line).

The first plate 104 is a first substrate support structure, and has a first surface 122 to which the first side 116 of the substrate 102 is attached or affixed, and held stationary with respect to the first surface 122. The second plate 106 is a second substrate support structure, and has a second surface 124 to which the second side 118 of the substrate 102 is attached or affixed, and held stationary with respect to the second surface 124. The plates 104, 106 are separated by a gap, which is bridged by a portion of the substrate 102 that forms the curve 120 when the substrate 102 is folded.

While the first and second substrate support structures in FIG. 1A are first and second plates, in other examples the first and second substrate support structures may be different. For example, other first and second substrate support structures may include clips or clamps to hold portions of the substrate 102 to enable folding without attachment of the substrate 102 to the plate.

The actuator 110 is coupled to the first plate 104 and the second plate 106 to move the plates 104, 106. As illustrated in FIGS. 1A and 1B, the actuator 110 moves plates 104, 106 between an open, flat, or unfolded position, in which the substrate 102 is unfolded (FIG. 1A) and a closed, or folded, position in which the substrate 102 is folded FIG. 1B). In some examples, the actuator 110 may be a motor attached to the first and second plates 104, 106 via respective linkages.

The load cells 112a, 112b measure loads on the first plate 104 and the second plate 104, respectively, while the actuator 110 moves the plates 104, 106. In particular, the load cells 112a, 112b measure stress on the substrate 102 as the substrate 102 is folded by measuring load exerted by the first side 116 of the substrate 102 onto the first plate 104 and load exerted by the second side 118 of the substrate 102 onto the second plate 106.

The translation linkages 114a, 114b limit movement of the first plate 104 and the second plate 106 in directions other than the directions in which the load cells 112a, 112b are loaded by the first plate 104 and the second plate 106, respectively. For example, if the load cell 112a is configured to measure loads in a direction perpendicular to the plane of the first surface 122, the translation linkage 114a limits movement of the first plate 104 in directions parallel to the plane of the first surface 122 while permitting load to be transferred from the first plate 104 to the load cell 112a (e.g., in a direction perpendicular to a surface of the first plate 104 and/or the substrate 102). Similarly, if the load cell 112b is configured to measure loads in a direction perpendicular to the plane of the second surface 124, the translation linkage 114b limits movement of the second plate 106 in directions parallel to the plane of the second surface 124 while permitting load to be transferred from the second plate 106 to the load cell 112b (e.g., in a direction perpendicular to a surface of the second plate 106 and/or the substrate 102).

The example translation linkages 114a, 114b may each include one or more four-bar linkages coupled to frames that are fixed with respect to the load cells 112a, 112b. In some examples, the translation linkages 114a, 114b are further limited in a direction toward the load cell 112a, 112b to prevent overloading of the load cells 112a, 112b. For example, a stopping point may be attached to the frame to prevent movement of the four-bar linkage(s) and the first plate 104 toward the load cell 112a beyond the stopping points.

In operation, the example load cells 112a, 112b may be biased or offset, after securing the substrate 102 to the first plate 104 and the second plate 106, to subtract a preload from the test measurements. For example, the preload on the load cells 112a, 112b may occur due to the weight of the plates 104, 106, the weight of translation linkages 114a, 114b, and the weight of the first side 116 of the substrate 102 on the first plate 104 and the weight of the second side of the substrate 102 on the second plate 106. By determining the preloads on the load cells 112a, 112b, the load cells 112a, 112b can be calibrated or offset to measure the stress on the substrate 102 during folding and unfolding.

In some examples, the test system 100 is positioned such that the first plate 104 and the second plate 106 are positioned vertically, and the plates 104, 106 are moved horizontally. For example, the axis of rotation of the plates 104, 106 is vertical, or straight up and down, and the weights of the plates 104, 106 are not directed toward the load cells 112a, 112b.

To reduce or prevent inducing stress on the substrate 102 due to the fixturing, the axes of rotation 126a, 126b (e.g., pivot points) are offset from the substrate 102. The length of the offset may be based on, for example, a folding radius r of the substrate 102. When the substrate 102 is unfolded into the open position, the distance between the plates 104, 106 (e.g., a distance bridged by the substrate 102) may also be based on the radius, such as a distance of approximately 3.14*r, which is approximately equal to the circumference of the folded portion of the substrate 102 in the folded or closed position. Additionally or alternatively, the offset between the axes 126a, 126b and the plates 104, 106 may be configured based on the radius, such that the distance between the plates 104, 106 is approximately 2*r. By configuring the axes 126a, 126b, and/or configuring the plates 104, 106 based on stationary axes 126a, 126b and the desired fold radius, the test system 100 permits the substrate 102 to fully extend when unfolded and to be folded to a desired fold radius, without inducing tension or compression stress on the substrate 102 due to the folding. In some examples, the folding radius may cause the substrate 102 to fail prematurely, which can be measured as part of the testing.

In the example of FIG. 1A, the measurements output by the load cells 112a, 112b are compensated for the weights of the first plate 104 and the second plate 106 and/or the inertial load of the first plate 104 and/or the inertial load of the second plate 106, to provide a measurement of the forces, stresses, or loads on the flexible substrate 102. For example, the portion of the weight of the second plate 106 and the portion of the inertial load of the second plate 106 that results in a measurable force by the load cell 112 may continuously change during the folding motion. A processing system (e.g., the processor 203 disclosed below) may be configured to compensate measurements received from the load cells 112a, 112b based on the characteristics, the folding directions, the folding speeds, and/or the folding paths of the first plate 104, the second plate 106 and/or of the actuator 110, and/or any other dynamic forces occurring during the folding and/or unfolding processes.

Figure 1C:
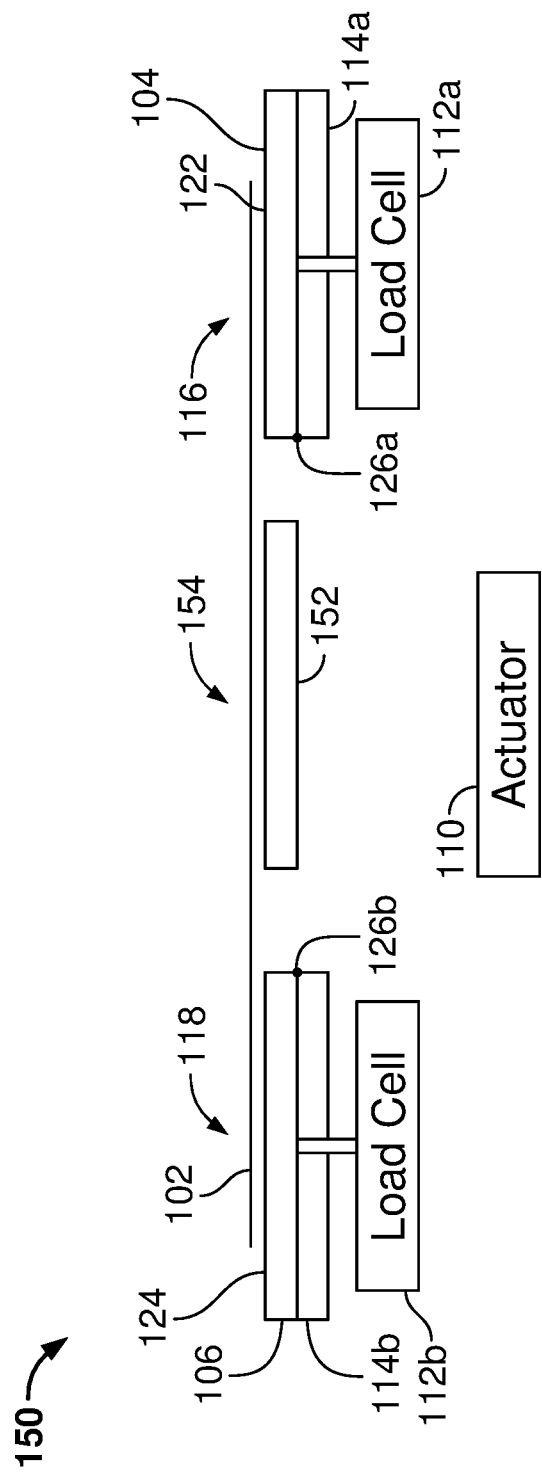
FIG. 1C is a block diagram of another example flexible substrate testing system configured to perform multiple folds on the substrate.

FIG. 1C is a block diagram of another example flexible substrate testing system 150 configured to perform multiple folds on the substrate 102. The example flexible substrate testing system 150 of FIG. 1C includes the first and second plates 104, 106, and further includes a third substrate support structure 152, such as a third plate.

In the example of FIG. 1C, the axes 126a, 126b are sufficiently offset as to cause multiple folds in the substrate 102 (e.g., trifold or more). For example, a third portion 154 of the substrate 102, such as a center portion of the substrate 102, is secured to the stationary support structure 152, while the plates 104, 106 are actuated to perform folds along multiple axes corresponding to the axes 126a, 126b.

Additionally or alternatively, while single fold axes and dual fold axes are disclosed above, other examples may have three or more folding axes using corresponding substrate support structures (e.g., plates) and corresponding gearing systems to control rotation of the substrate support structures. Furthermore, while the example of FIG. 1C is configured to fold both sections of the substrate 116, 118 toward a same side of the third section 154, in other examples the plates 104, 106 and the axes 126a, 126b are configured to fold the sections 116, 118 toward opposite sides of the third section 154 (e.g., a Z-shaped fold as opposed to a U-shaped fold).

Figure 2:
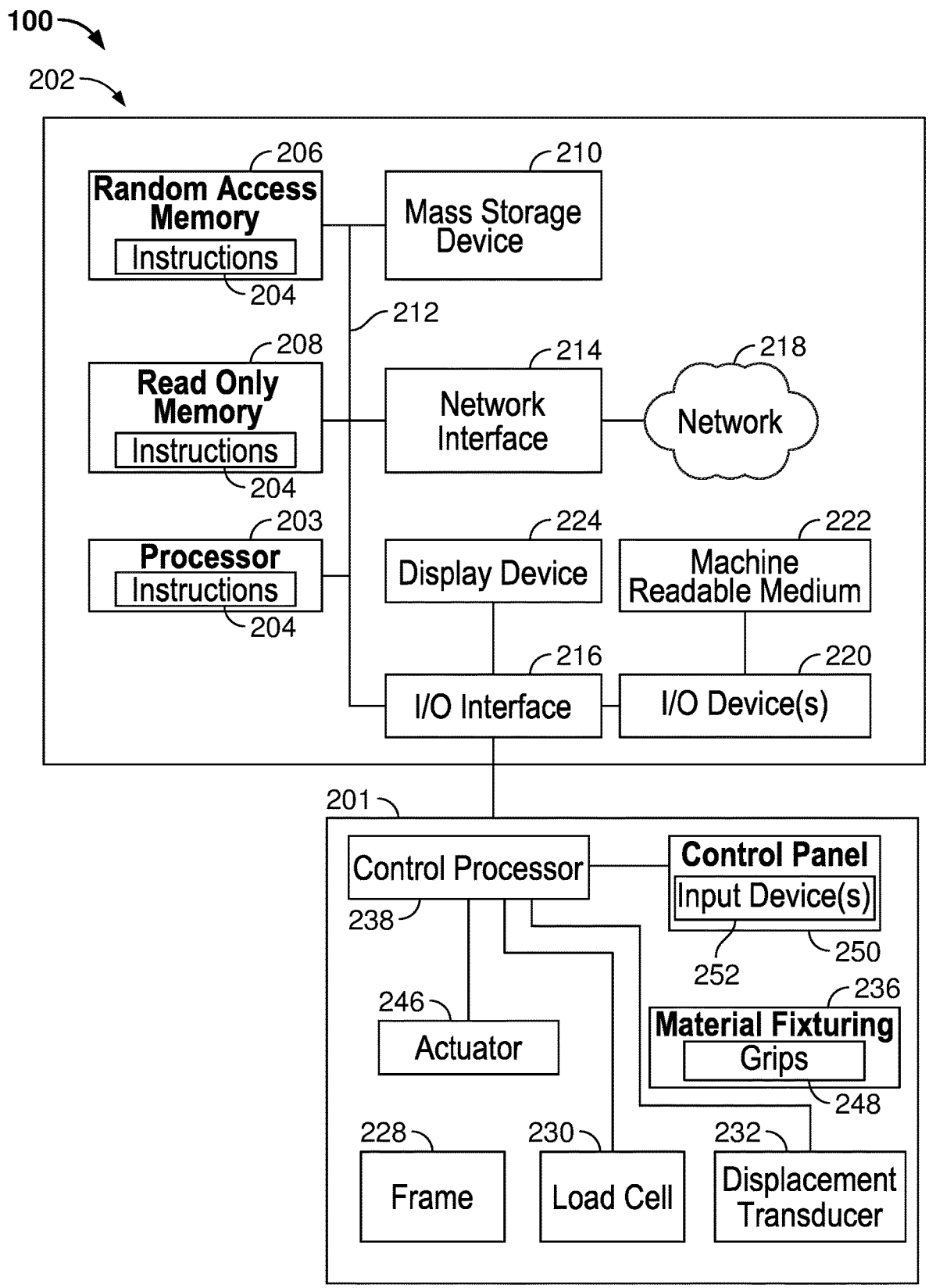
FIG. 2 is a block diagram of an example implementation of the flexible substrate test system of FIG. 1.

FIG. 2 is a block diagram of an example implementation of the flexible substrate test system 100 of FIG. 1A. As illustrated in FIG. 2, the flexible substrate test system 100 includes a test fixture 201 and a computing device 202.

The example computing device 202 may be a general-purpose computer, a laptop computer, a tablet computer, a mobile device, a server, an all-in-one computer, and/or any other type of computing device. The computing device 202 of FIG. 2 includes a processor 203, which may be a general-purpose central processing unit (CPU). In some examples, the processor 203 may include one or more specialized processing units, such as FPGA, RISC processors with an ARM core, graphic processing units, digital signal processors, and/or system-on-chips (SoC). The processor 203 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 203, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 2 includes hardware, firmware, and/or software to connect one or more input/output devices 220 to the processor 203 for providing input to the processor 203 and/or providing output from the processor 203. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 202 may access a non-transitory machine-readable medium 222 via the I/O interface 216 and/or the I/O device(s) 220. Examples of the machine-readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The test fixture 201 is coupled to the computing device 202. In the example of FIG. 2, the test fixture 201 is coupled to the computing device via the I/O interface 216, such as via a USB port, a Thunderbolt port, a FireWire (IEEE 1394) port, and/or any other type serial or parallel data port. In some examples, the test fixture 201 is coupled to the network interface 214 and/or to the I/O interface 216 via a wired or wireless connection (e.g., Ethernet, Wi-Fi, etc.), either directly or via the network 218.

The test fixture 201 includes a frame 228, a load cell 230, material fixtures 236, and a control processor 238. The frame 228 provides rigid structural support for the other components of the test fixture 201 that perform the test. The load cell 230 may implement the load cell 112 of FIG. 1A, and measures force applied to a material under test (e.g., the substrate 102) by an actuator 246 via grips 248 (e.g., the plates 104, 106).

The actuator 246 applies force to the material under test and/or forces displacement of the material under test, while the grips 246 grasp or otherwise couple the material under test to the actuator 234.

Example actuators that may be used to provide force and/or motion of a component of the test fixture 201 include electric motors, pneumatic actuators, hydraulic actuators, piezoelectric actuators, relays, and/or switches. While the example test fixture 201 uses a motor, such as a servo or direct-drive linear motor, other systems may use different types of actuators. For example, hydraulic actuators, pneumatic actuators, and/or any other type of actuator may be used based on the requirements of the system.

The example grips 236 include platens, clamps, and/or other types of fixtures, depending on the mechanical property being tested and/or the material under test. The grips 236 may be manually configured, controlled via manual input, and/or automatically controlled by the control processor 238.

The test system 100 may further include one or more control panels 250, including one or more input devices 252. The input devices 252 may include buttons, switches, and/or other input devices located on an operator control panel. For example, the input devices 252 may include buttons that control the actuator 242 to jog (e.g., position) the grips 248 to a desired position, switches (e.g., foot switches) that control the grips 248 to close or open (e.g., via another actuator), and/or any other input devices to control operation of the testing test fixture 201.

The example control processor 238 communicates with the computing device 202 to, for example, receive test parameters from the computing device 202 and/or report measurements and/or other results to the computing device 202. For example, the control processor 238 may include one or more communication or I/O interfaces to enable communication with the computing device 202. The control processor 238 may control the actuator 246 to move in a given direction and/or to control the speed of the actuator 246, control the fixture(s) 236 to grasp or release a material under test, and/or receive measurements from the displacement transducer 232, the load cell 230 and/or other transducers. In some examples, the control processor 238 monitors a folding angle by monitoring a motor encoder of the actuator 246, which may be used to establish a folding degree-per-pulse ratio.

The example control processor 238 is configured to implement a repetitive motion testing process in which a test specimen (e.g., the substrate 102) is subjected to testing in the test fixture 201. For example, to measure stress on the substrate 102 during or after a series of folding and unfolding motions, the control processor 238 controls the actuator 246 to move the grips 248 (e.g., the first and second plates 104, 106) while monitoring the load cell 230 to measure stress on the substrate 102.

The example processor 203 may determine a static load on the flexible substrate 102 based on a load measured by the load cell 230 at a completion of the folding or unfolding of the flexible substrate 102. The static load measurement may occur after a relaxation time has been permitted to expire to enable the substrate 102 to relax following a folding or unfolding process. Additionally or alternatively, the example processor 203 may determine a dynamic load on the flexible substrate 102 based on loads measured by the load cell 230 during the folding or unfolding of the flexible substrate 102. The example processor 203 may perform compensation of measurements from the load cell(s) 230, such as removing the effects of weight of the first plate 104, and/or weight and inertial load of the second plate 106, from the load measurements.

Figure 3:
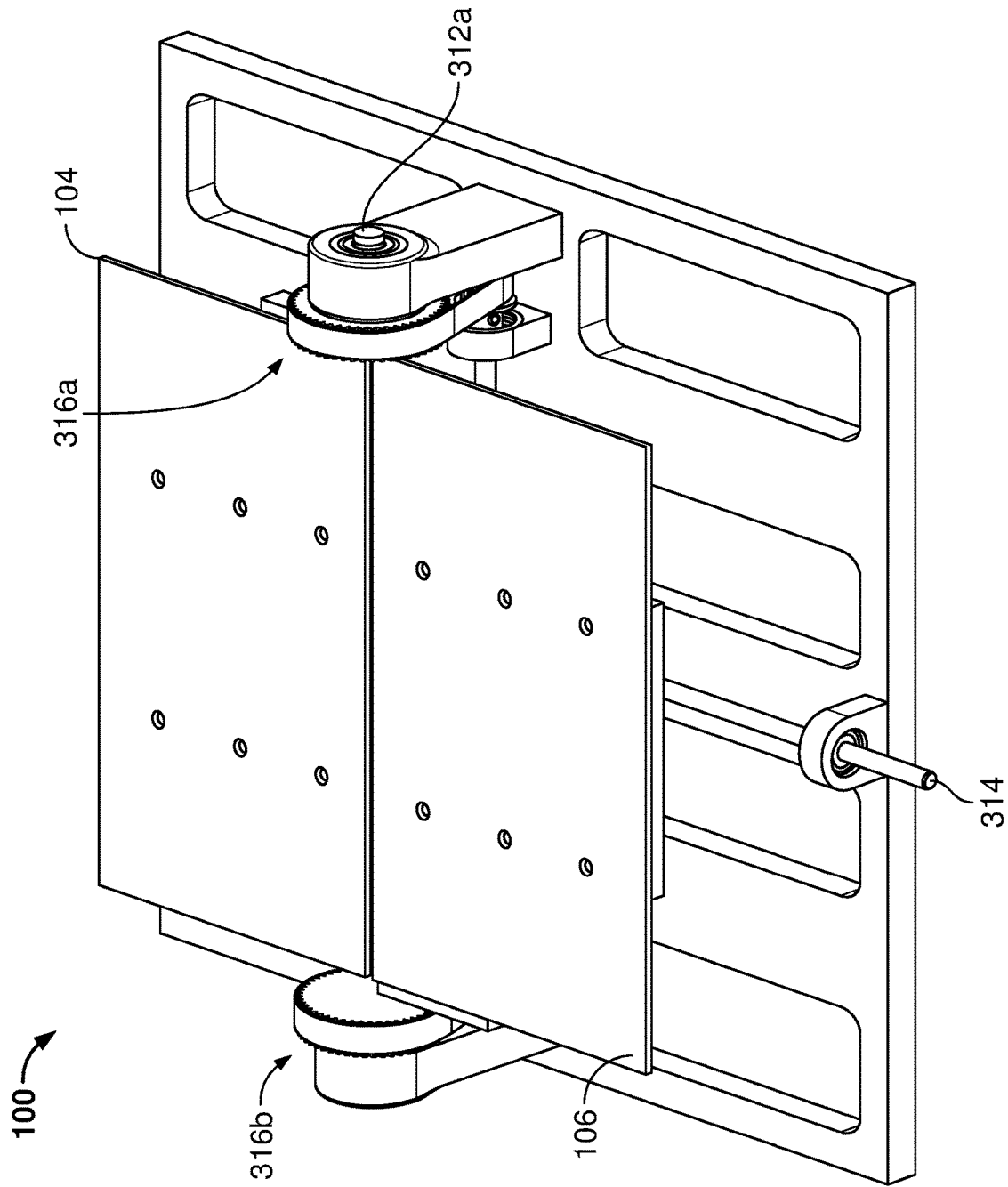
FIG. 3 is a perspective view of an example implementation of the flexible substrate test system of FIG. 1, illustrating the first and second plates in an open or flat position.
Figure 4:
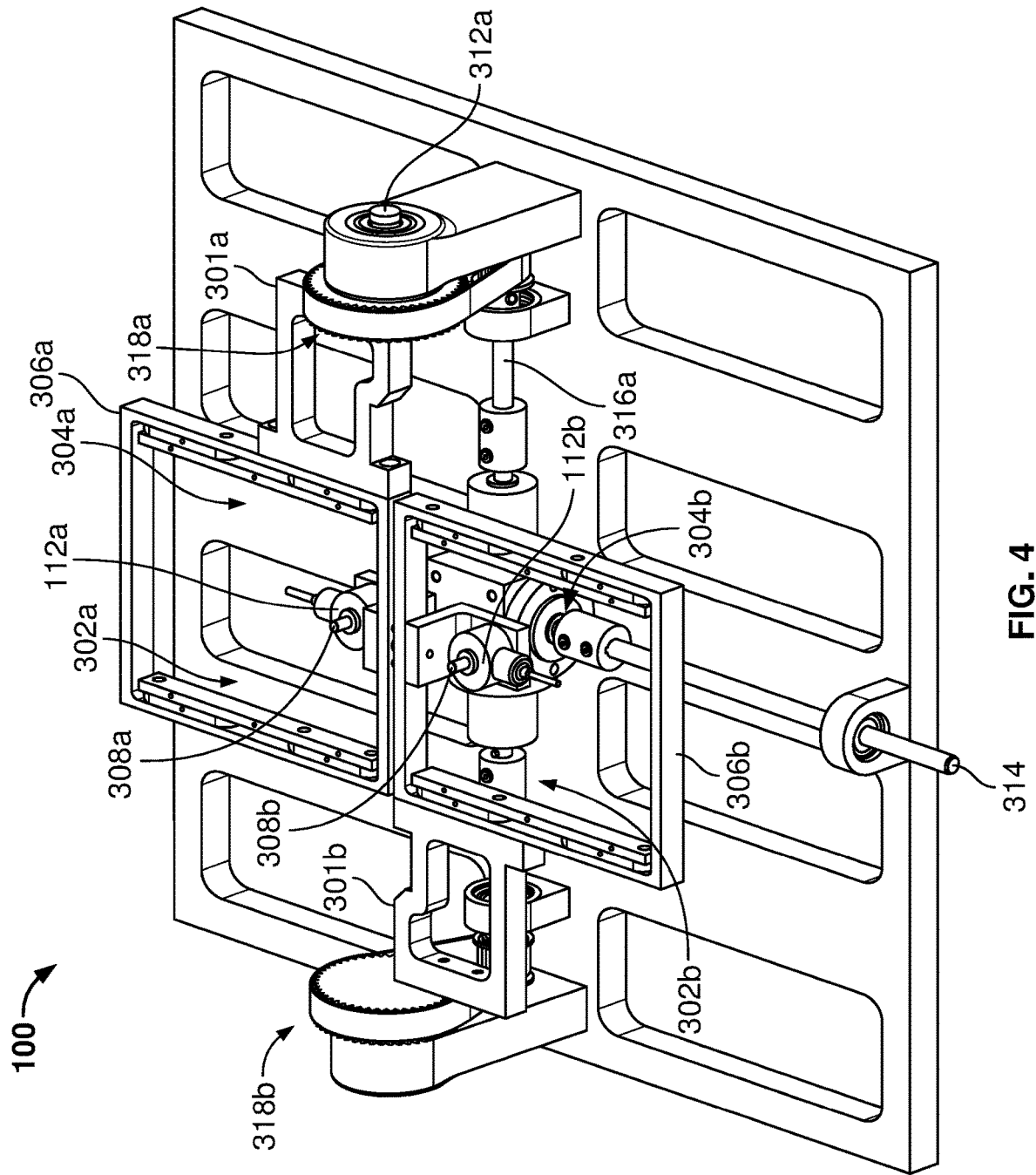
FIG. 4 is a perspective view of the example flexible substrate test system of FIG. 3, in the open or flat position and omitting the first and second plates.
Figure 5:
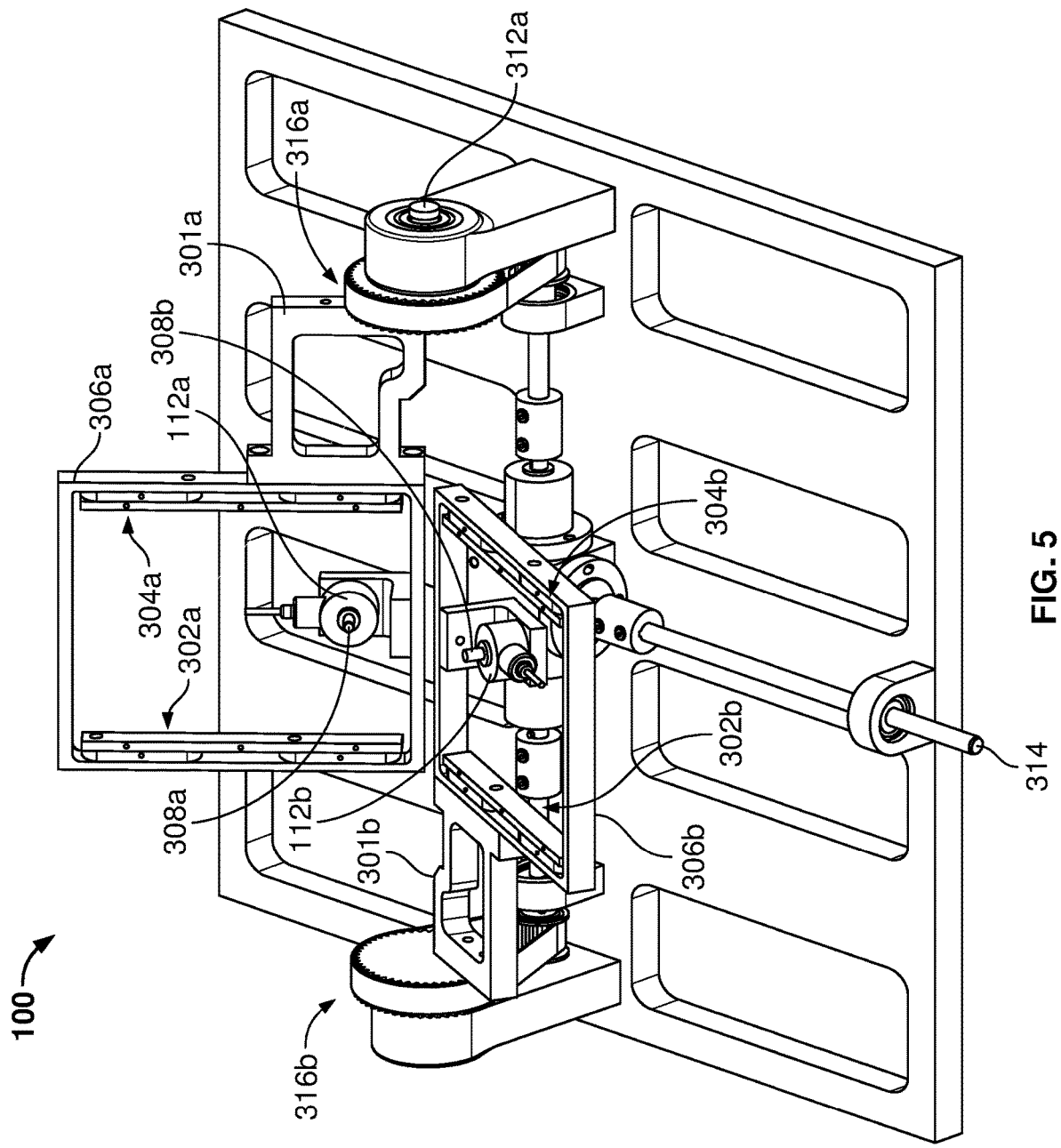
FIG. 5 is a perspective view of the example flexible substrate test system of FIG. 3, in an intermediate position.
Figure 6:
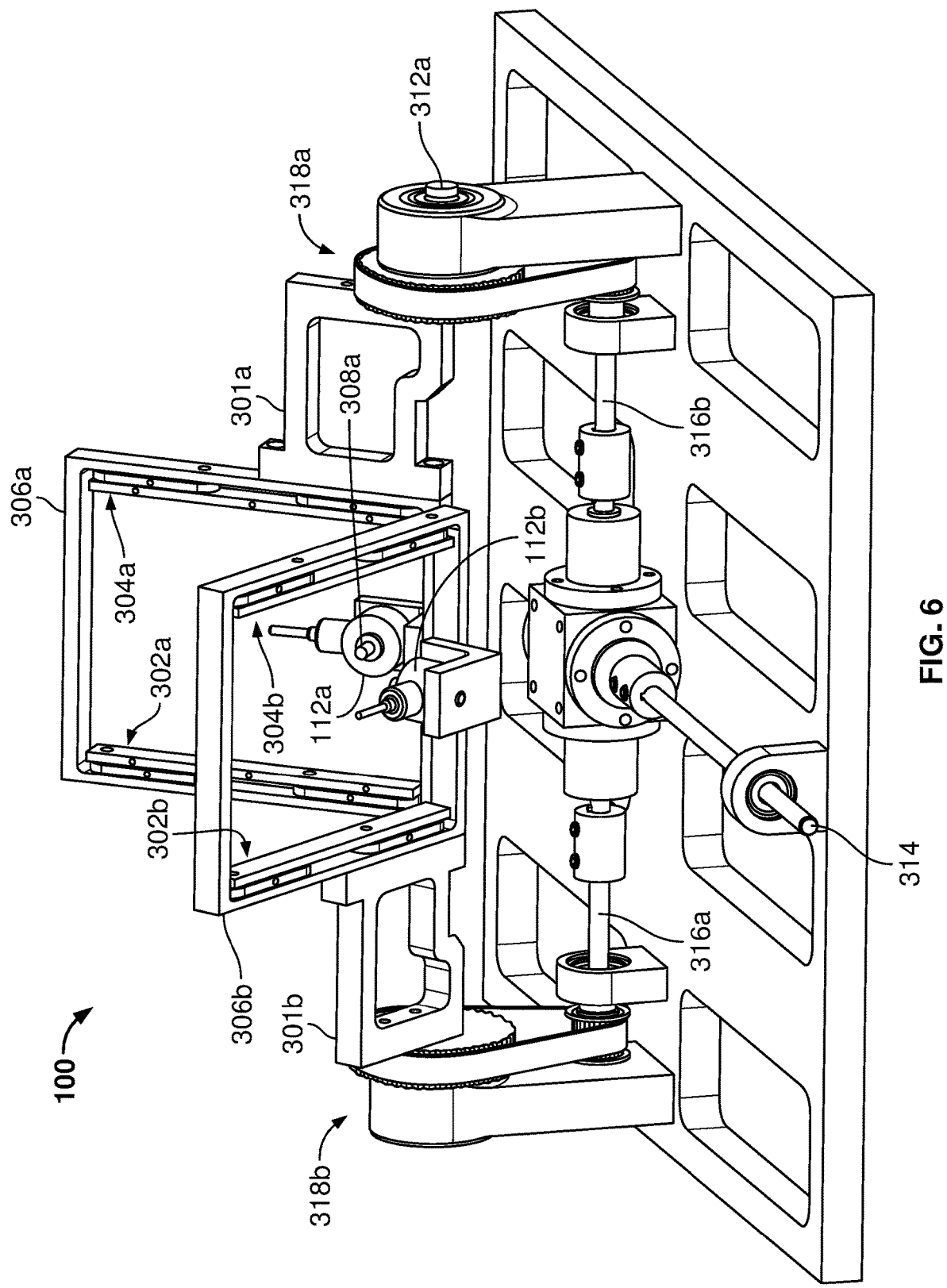
FIG. 6 is another perspective view of the example flexible substrate test system of FIG. 3, in the intermediate position.
Figure 7:
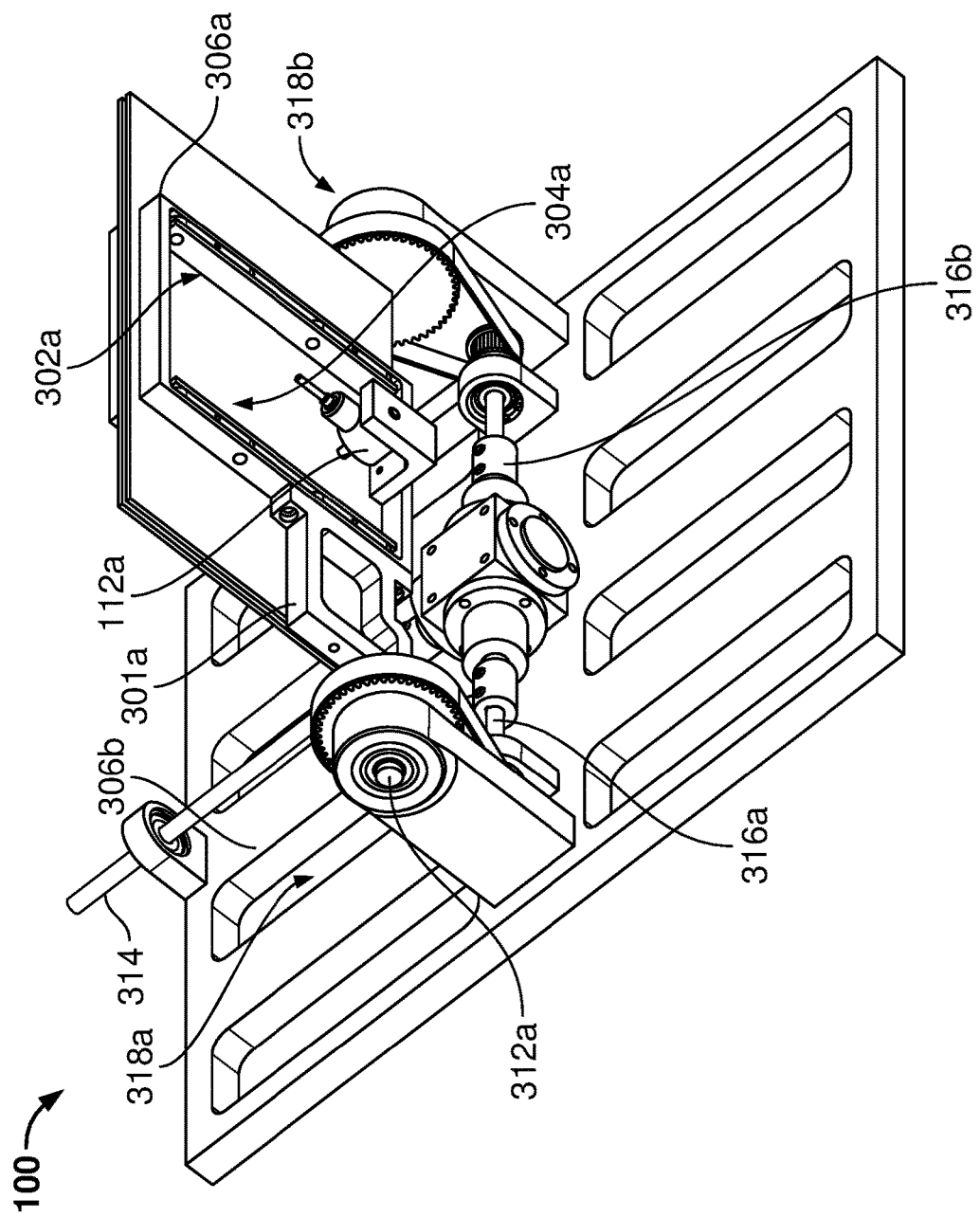
FIG. 7 is a perspective view of the example flexible substrate test system of FIG. 3, in a closed or folded position.
Figure 8:
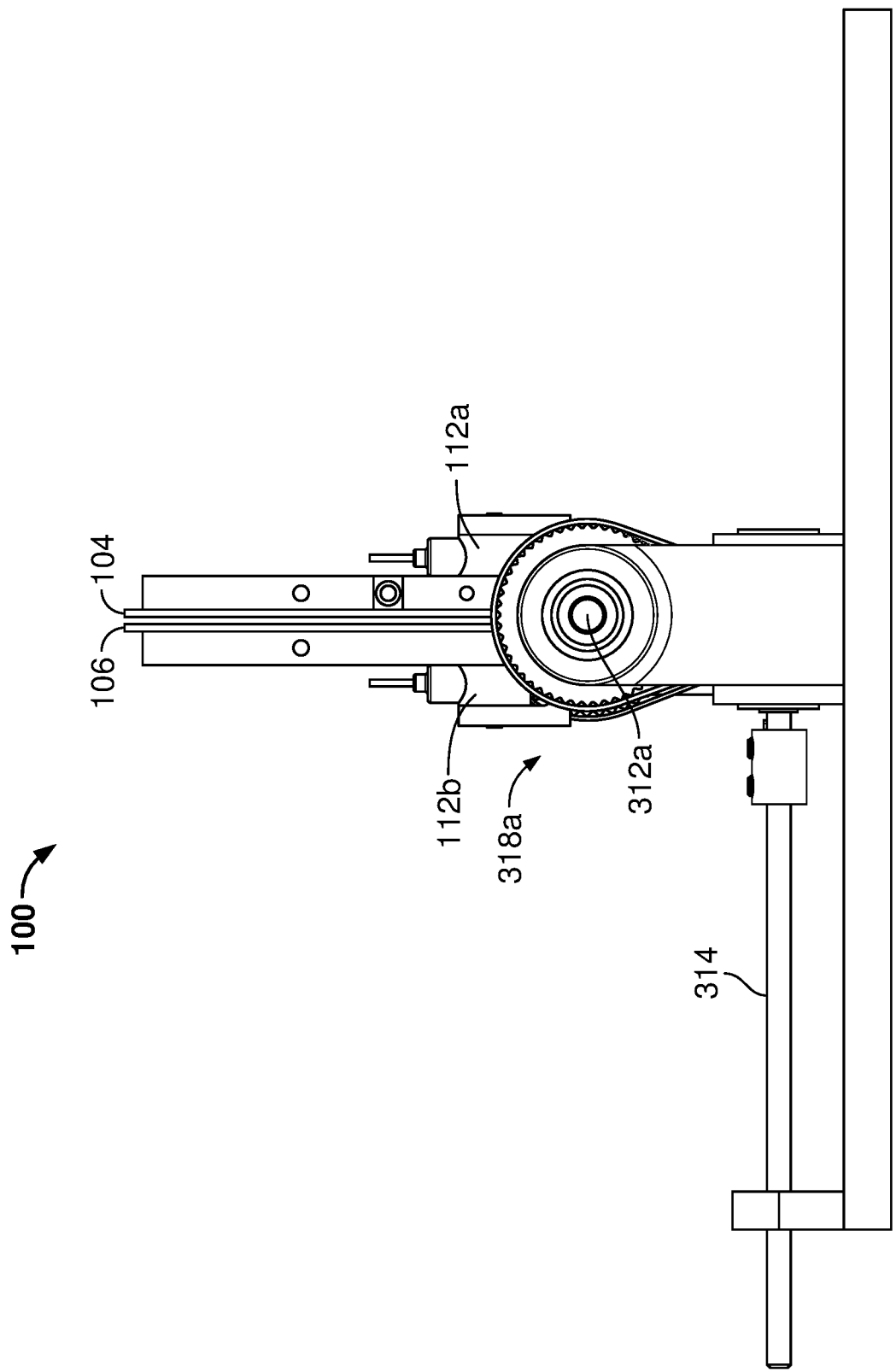
FIG. 8 is a side elevation view of the example flexible substrate test system of FIG. 3, in the closed or folded position.

FIG. 3 is a perspective view of an example implementation of the flexible substrate test system 100 of FIG. 1A, illustrating the first and second plates 104, 106 in an open or flat position. FIG. 4 is a perspective view of the example flexible substrate test system 100 of FIG. 3, in the open or flat position and omitting the first and second plates. FIG. 5 is a perspective view of the example flexible substrate test system 100 of FIG. 3, in an intermediate position (e.g., between the open position and the closed position). FIG. 6 is another perspective view of the example flexible substrate test system of FIG. 3, in the intermediate position. FIG. 7 is a perspective view of the example flexible substrate test system 100 of FIG. 3, in a closed or folded position. FIG. 8 is a side elevation view of the example flexible substrate test system 100 of FIG. 3, in the closed or folded position.

The example translation linkages 114a, 114b each include a first four-bar linkage 302a, 302b, a second four-bar linkage 304a, 304b, and a frame 306a, 306b. The frame 306a and the load cell 112a are stationary with respect to each other by attachment to a rotational assembly 310a. The frame 306b and the load cell 112b are stationary with respect to each other by attachment to a rotational assembly 310b. The first and second four-bar linkages 302a, 302b, 304a, 304b are each configured to attach the first plate 104 or second plate 106 via the innermost links. The first and second four-bar linkages 302a, 304a limit movement of the first plate 104 in directions parallel to the surface of the first plate 104 on which the substrate 102 is mounted, while permitting loads from the first plate 104 to be transferred to the load cell 112a (e.g., via an extension post 308a coupled to the load cell 112a) in a direction perpendicular to the surface of the first plate 104 (illustrated as direction Z in FIG. 3).

To avoid overloading of the load cells 112a, 112b, the frames 306a, 306b include stopping points configured to prevent the first and second four-bar linkages 302, 304 and/or the first plate 104 or second plate 106 from traveling toward the load cell 112a, 112b beyond the stopping point. The stopping point may be implemented using, for example, a pin or other rigid fastener configured to contact an underside of the first and/or second four-bar linkages 302a, 302b, 304a, 304b, a top surface of the frame 306a, 306b, a bumper or rigid offset coupled to a top surface of the frame 306a, 306b to provide the stopping point via contact with first plate 104 or the second plate 106, and/or any other technique.

The rotational arms 301a, 301b are configured to rotate and translate the first plate 104 and the second plate 106 to fold and unfold the substrate 102. The rotational arms 301a, 301b are coupled to axes of rotation 312a, 312b (e.g., pivot points). An actuator may rotate both of the rotational arms 301a, 301b simultaneously by driving an input shaft 314. The input shaft 314 is coupled to secondary shafts 316a, 316b, which drive respective gearing systems 318a, 318b coupled to the rotational arms 301a, 301b. In some examples, the gear ratios are the same between the input shaft 314 and the rotational arms 301a, 301b to cause both plates 104, 106 to fold simultaneously and proportionally.

While the example of FIG. 3 includes the gearing systems 318a, 318b to define the folding path of the substrate 102, in other examples the guide may be different. For example, other guides may include having multiple gears, in which a first gear is free to spin and is aligned with the edge of the first side of the substrate 102, and a second gear is meshed with the first gear and fixed with respect to the second half of the substrate 102. Other example guides may include combinations of two linear actuators arranged perpendicular to each other, with one linear actuator in a combination mounted to the other linear actuator. The first plate 104 and the second plate 106 are attached to respective ones of the actuator combinations, and could move freely in an x-y plane and trace out the folding path. Multiple linear actuators may enable the guide to implement different types of paths, including folds of different radii and/or non-circular folds. Some other example guides may include a series of linkages defining the folding path.

Figure 9:
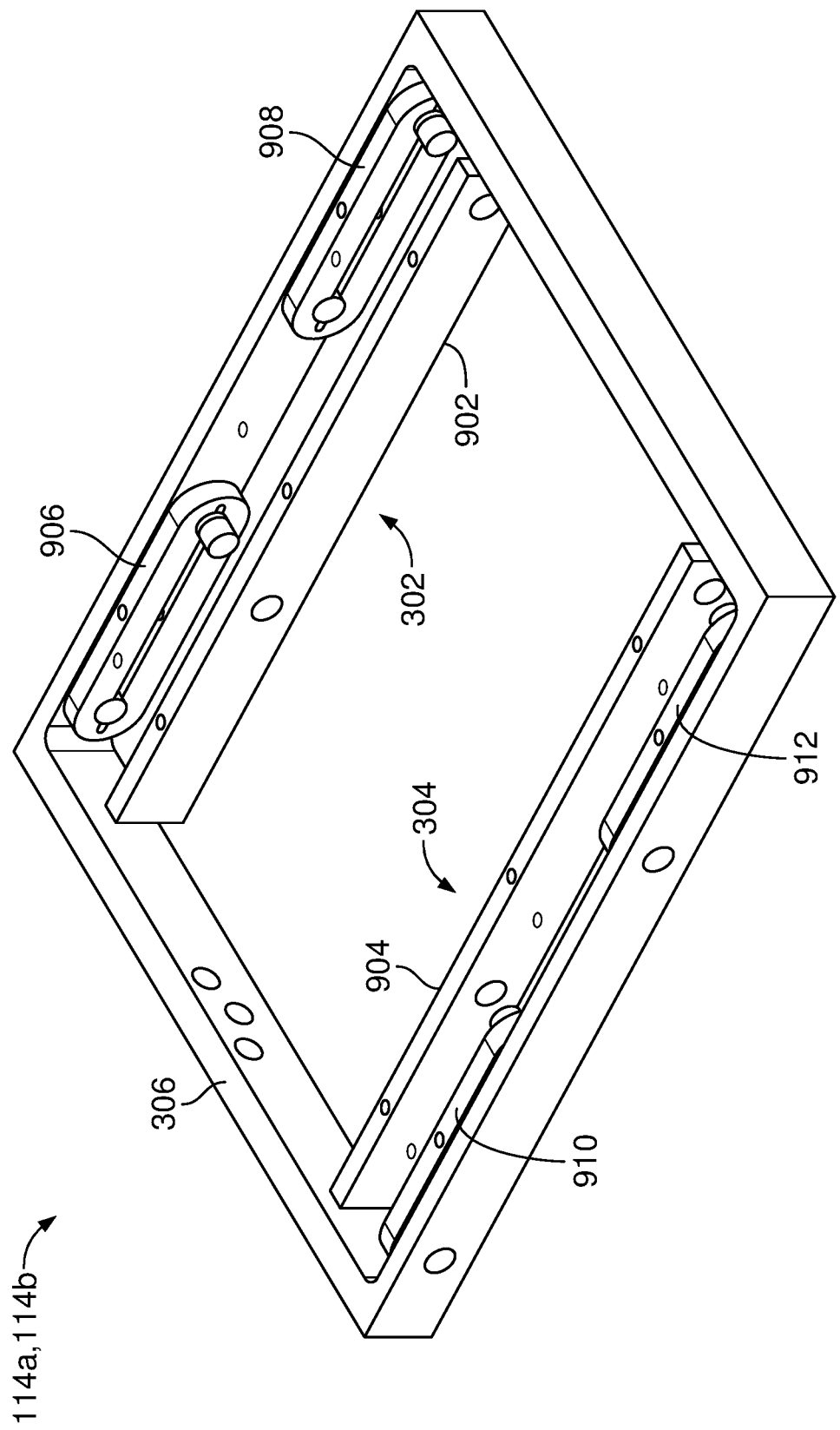
FIG. 9 is a partially exploded view of the translation linkage of FIG. 3.

FIG. 9 is a partially exploded view of the translation linkage of FIGS. 4-8. In particular, the example translation linkage 114a is shown with inner linkages 902, 904 of the four-bar linkages 302, 304 separated from intermediate linkages 906, 908, 910, 912, respectively. The intermediate linkages 906-912 couple the inner linkages 902, 904 to the frame 306, which serves as a portion of the four-bar linkages 302, 304.

Figure 10:
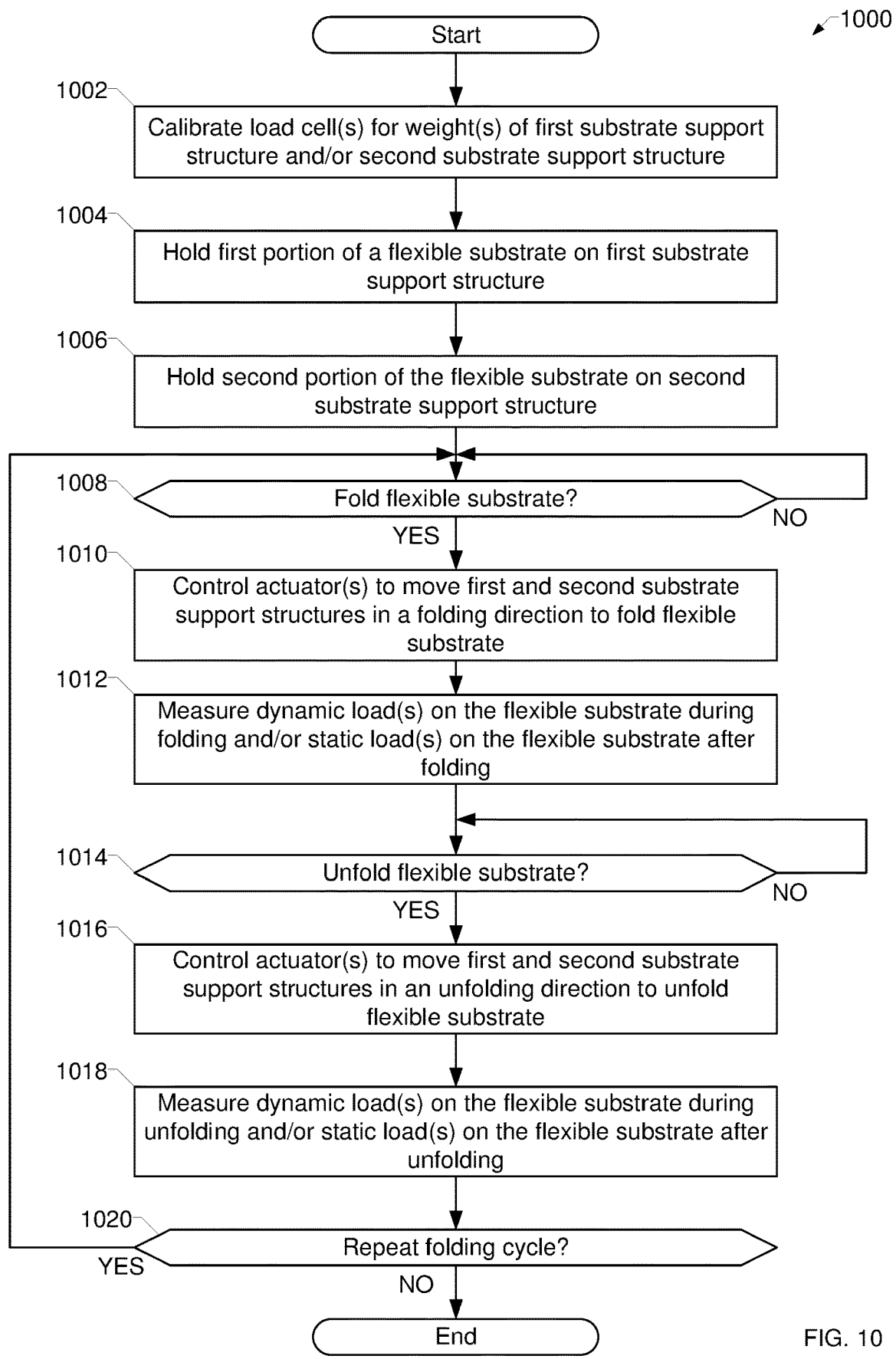
FIG. 10 is a flowchart representative of an example method to measure loads on a flexible substrate, which may be performed by the example flexible substrate test systems of FIGS. 1-9.

FIG. 10 is a flowchart representative of an example method 1000 to measure loads on a flexible substrate, which may be performed by the example flexible substrate test systems of FIGS. 1A-11. The example method 1000 is disclosed below with reference to FIGS. 1A and 2.

At block 1002, the processor 203 and/or the control processor 238 calibrate the load cell(s) 112, 230 to compensate for the weight(s) of the first and/or second substrate support structure(s) (e.g., the first plate 104, the second plate 106), the translation linkage 114, and/or any other forces that affect the measurement by the load cell(s) 112, 230.

At block 1004, the first substrate support structure (e.g., the first plate 104) holds a first portion of the flexible substrate 102 stationary. At block 1006, the second substrate support structure (e.g., the second plate 106) holds a second portion of the flexible substrate 102.

At block 1008, the processor 203 and/or the control processor 238 determine whether to fold the flexible substrate 102. For example, the processor 203 may determine whether a folding cycle (e.g., folding and unfolding) is to be performed. If the folding is not to be performed (block 1008), control iterates to block 1008 to await folding.

When folding is to be performed (block 1008), at block 1010 the processor 203 and/or the control processor 238 control the actuator 110 to move the first and second substrate support structures (e.g., the first and second plates 104, 106) in a folding direction to fold the flexible substrate 102. In some examples, a gearing system or other guide may be used to control the bend radius and/or folding path of the flexible substrate 102 during the folding. At block 1012, the load cell(s) 112a, 112b, 230 measure dynamic load(s) on the flexible substrate 102 during the folding and/or measure static load(s) on the flexible substrate 102 after folding.

At block 1014, the processor 203 and/or the control processor 238 determine whether to unfold the flexible substrate 102. If the unfolding is not to be performed (block 1014), control iterates to block 1014 to await unfolding.

When unfolding is to be performed (block 1014), at block 1016 the processor 203 and/or the control processor 238 control the actuator 110 to move the first and second substrate support structures in an unfolding direction to unfold the flexible substrate 102. In some examples, a gearing system or other guide may be used to control the bend radius and/or folding path of the flexible substrate 102 during the unfolding. At block 1018, the load cell(s) 112, 230 measure dynamic load(s) on the flexible substrate 102 during the unfolding and/or measure static load(s) on the flexible substrate 102 after unfolding.

At block 1020, the processor 203 and/or the control processor 238 determine whether to repeat the folding cycle. For example, the flexible substrate 102 may be subject to a testing process involving multiple folding cycles. If the folding cycle is to be repeated (block 1020), control returns to block 1008. If the folding cycle is not to be repeated (block 1020), the example method 1000 ends.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A flexible substrate testing system, comprising:
   a first substrate support structure configured to hold a first portion of a flexible substrate under test;
   a second substrate support structure configured to hold a second portion of the flexible substrate;
   one or more actuators configured to move the first and second substrate support structures at respective angles to fold the flexible substrate;
   a first load cell rigidly coupled to the first substrate support structure and configured to measure a first load on the first substrate support structure; and
   a second load cell rigidly coupled to the second substrate support structure and configured to measure a second load on the second substrate support structure while the actuator moves the first substrate support structure and the second substrate support structure.

2. The flexible substrate testing system as defined in claim 1, further comprising control circuitry configured to determine the loads on the flexible substrate based on load information from the first and second load cells.

3. The flexible substrate testing system as defined in claim 1, wherein the one or more actuators are configured to move the first and second substrate support structures simultaneously.

4. The flexible substrate testing system as defined in claim 3, wherein the one or more actuators are configured to move the first and second substrate support structures by driving a single input shaft.

5. The flexible substrate testing system as defined in claim 4, wherein the input shaft is coupled to a first secondary shaft configured to move the first substrate support structure and to a second secondary shaft configured to move the second substrate support structure.

6. The flexible substrate testing system as defined in claim 1, wherein the first substrate support structure comprises a first plate having a first surface and the second substrate support structure comprises a second plate having a second surface.

7. The flexible substrate testing system as defined in claim 6, wherein the flexible substrate testing system is configured to position a first plane of the first surface and a second plane of the second surface vertically during the folding and unfolding.

8. The flexible substrate testing system as defined in claim 6, further comprising a first translation linkage configured to hold the first substrate support structure and to limit motion of the first substrate support structure in directions parallel to the first surface of the first substrate support structure.

9. The flexible substrate testing system as defined in claim 8, further comprising a second translation linkage configured to hold the second substrate support structure and to limit motion of the second substrate support structure in directions parallel to the second surface of the second substrate support structure.

10. The flexible substrate testing system as defined in claim 9, wherein the first translation linkage comprises a first four-bar linkage coupled to the first substrate support structure and the second translation linkage comprises a second four-bar linkage coupled to the second substrate support structure.

11. The flexible substrate testing system as defined in claim 1, wherein the first and second substrate support structures are configured to fold the flexible substrate to an angle of more than 0 degrees and less than or equal to 360 degrees.

12. The flexible substrate testing system as defined in claim 11, wherein the first substrate support structure is configured to rotate up to 90 degrees and the second substrate support structure is configured to rotate up to 90 degrees to fold the flexible substrate at an angle of up to 180 degrees.

13. The flexible substrate testing system as defined in claim 1, further comprising control circuitry configured to determine the first and second loads on the flexible substrate based on a dynamic load measured by the first and second load cells during the folding or unfolding of the flexible substrate.

14. The flexible substrate testing system as defined in claim 1, further comprising control circuitry configured to determine the load on the flexible substrate based on a static load measured by the first and second load cells at a completion of the folding or unfolding of the flexible substrate.

15. A flexible substrate testing, comprising:
a first substrate support structure configured to hold a first portion of a flexible substrate under test;
a second substrate support structure configured to hold a second portion of the flexible substrate;
one or more actuators configured to move the first and second substrate support structures simultaneously and at respective angles to fold the flexible substrate by driving a single input shaft, wherein the input shaft is coupled to a first secondary shaft configured to move the first substrate support structure and to a second secondary shaft configured to move the second substrate support structure; and
load cells configured to measure loads on the first substrate support structure and the second substrate support structure while the actuator moves the first substrate support structure and the second substrate support structure;
wherein the first secondary shaft is coupled to the first substrate support structure via a first gearing system configured to rotate the first substrate support structure about a first axis defined by the first gearing system, and the second secondary shaft is coupled to the second substrate support structure via a second gearing system configured to rotate the second substrate support structure about a second axis defined by the second gearing system.

16. The flexible substrate testing system as defined in claim 15, wherein the first and second gearing systems are configured to rotate the first portion of the flexible substrate and the second portion of the flexible substrate simultaneously and proportionally.

17. The flexible substrate testing system as defined in claim 15, wherein the first axis and the second axis are spaced apart so as to create multiple folds in the flexible substrate.

18. A method to measure loads on a flexible substrate, the method comprising:
moving, via an actuator, a first portion of a flexible substrate under test and a second portion of the flexible substrate to fold or unfold the flexible substrate; and
measuring a load on the flexible substrate resulting from the moving by measuring a load normal to a surface of the first portion of the flexible substrate over a duration of the folding or unfolding of the flexible substrate.

19. The method as defined in claim 18, wherein moving the first portion of the flexible substrate comprises rotating a first substrate support structure holding the first portion of the flexible substrate, and moving the second portion of the flexible substrate comprises rotating a second substrate support structure holding the second portion of the flexible substrate.

20. A flexible substrate testing system, comprising:
a first plate comprising a first surface configured to hold a first side of a flexible substrate under test;
a first translation linkage configured to hold the first plate and to limit motion of the first plate in directions parallel to the first surface of the first plate;
a second plate comprising a second surface configured to hold a second side of the flexible substrate;
a second translation linkage configured to hold the second plate and to limit motion of the second plate in directions parallel to the second surface of the second plate;
one or more actuators configured to move the first and second plates at respective angles to fold the flexible substrate to an angle greater than 0 degrees and less than or equal to 180 degrees; and
load cells configured to measure separate loads on the first plate and the second plate while the actuator moves the first plate and the second plate, wherein the load cells have respective fixed angular orientations with respect to the first plate and the second plate.

* * * * *